US009067468B2

(12) United States Patent
Stanifer et al.

(10) Patent No.: US 9,067,468 B2
(45) Date of Patent: Jun. 30, 2015

(54) UNDERBED HITCH MOUNTING SYSTEM

(71) Applicant: Cequent Performance Products, Inc., Plymouth, MI (US)

(72) Inventors: Eric J. Stanifer, Mishawaka, IN (US); Richard W. McCoy, Granger, IN (US)

(73) Assignee: Cequent Performance Products, Inc., Plymouth, MI (US)

( * ) Notice: Subject to any disclaimer, the term of this patent is extended or adjusted under 35 U.S.C. 154(b) by 0 days.

(21) Appl. No.: 13/790,134

(22) Filed: Mar. 8, 2013

(65) Prior Publication Data
US 2013/0187362 A1    Jul. 25, 2013

Related U.S. Application Data

(63) Continuation of application No. 12/609,062, filed on Oct. 30, 2009, now Pat. No. 8,414,009.

(60) Provisional application No. 61/197,732, filed on Oct. 30, 2008.

(51) Int. Cl.
*B60D 1/06* (2006.01)
*B60D 1/48* (2006.01)
*B60D 1/02* (2006.01)
(Continued)

(52) U.S. Cl.
CPC ...... *B60D 1/488* (2013.01); *B60D 1/02* (2013.01); *B60D 1/06* (2013.01); *B60D 1/52* (2013.01); *B62D 53/0828* (2013.01)

(58) Field of Classification Search
CPC ............ B60D 1/02; B60D 1/06; B60D 1/488; B60D 1/52; B62D 53/0828
USPC .......... 280/433, 438.1, 441.1; 410/102, 106, 410/180
See application file for complete search history.

(56) References Cited

U.S. PATENT DOCUMENTS

| 1,958,723 A | 5/1934 | Spencer |
| 1,996,162 A | 4/1935 | Lubbers |
| 2,027,990 A | 1/1936 | Lubbers |

(Continued)

FOREIGN PATENT DOCUMENTS

| DE | 2121876 | 4/1971 |
| EP | 0038928 B1 | 4/1981 |

(Continued)

OTHER PUBLICATIONS

International Search Report for International App. No. PCT/US2011/063922 mailed May 8, 2012.

(Continued)

*Primary Examiner* — Joseph Rocca
*Assistant Examiner* — Jacob Knutson
(74) *Attorney, Agent, or Firm* — McDonald Hopkins LLC; Jeff Urian

(57) ABSTRACT

An underbed hitch mounting system is described. The mounting system may be utilized for towing vehicles wherein the mounting system may selectively accommodate either a fifth wheel hitch or a gooseneck hitch. The mounting system may include at least one rail capable of being connected to a vehicle frame, wherein the rail includes at least one socket. The socket may be engaged with a receiving member, wherein the receiving member may be engaged with a leg of a fifth wheel hitch. A mid rail may be connected to the rails and may include a hitch ball socket that is capable of engagement with a hitch.

30 Claims, 7 Drawing Sheets

(51) Int. Cl.
*B60D 1/52* (2006.01)
*B62D 53/08* (2006.01)

(56) References Cited

U.S. PATENT DOCUMENTS

| | | | |
|---|---|---|---|
| 2,041,124 A | 5/1936 | Francis |
| 2,289,079 A | 7/1942 | Seyferth |
| 2,507,616 A | 5/1950 | Stephen |
| 2,513,117 A | 6/1950 | Stephen |
| 2,543,749 A | 3/1951 | Walther |
| 2,610,069 A | 9/1952 | Ketel |
| 2,621,056 A | 12/1952 | Kayler |
| 2,680,627 A | 6/1954 | Johnson et al. |
| 2,749,144 A | 6/1956 | Kayler |
| 2,778,657 A | 1/1957 | Chaplin |
| 2,779,605 A | 1/1957 | Braunberger |
| 2,799,516 A | 7/1957 | Greenway |
| 2,809,851 A | 10/1957 | Beck |
| 2,819,096 A | 1/1958 | Sencenich |
| 2,856,203 A | 10/1958 | Kayler |
| 2,860,891 A | 11/1958 | Ramun |
| 2,900,194 A | 8/1959 | De Lay |
| 2,925,286 A | 2/1960 | Hodges, Jr. et al. |
| 2,977,137 A | 3/1961 | Durham |
| 2,985,463 A | 5/1961 | Geerds |
| 3,073,624 A | 1/1963 | Thomas |
| 3,112,936 A | 12/1963 | Cole et al. |
| 3,170,716 A | 2/1965 | Walther et al. |
| 3,171,672 A | 3/1965 | Dalton |
| 3,198,549 A | 8/1965 | Martin |
| 3,220,750 A | 11/1965 | Mead |
| 3,318,616 A | 5/1967 | Fontaine et al. |
| 3,402,944 A | 9/1968 | Day |
| 3,584,899 A | 6/1971 | Gottler et al. |
| 3,595,125 A | 7/1971 | Jacobs |
| 3,606,384 A | 9/1971 | Fontaine et al. |
| 3,630,545 A | 12/1971 | Fontaine et al. |
| 3,640,549 A | 2/1972 | Neff et al. |
| 3,746,369 A | 7/1973 | Neff et al. |
| 3,844,584 A | 10/1974 | Fontaine |
| 3,847,414 A | 11/1974 | Madura |
| 3,861,709 A | 1/1975 | Mulcahy et al. |
| 3,888,514 A | 6/1975 | Klein |
| 3,893,710 A | 7/1975 | Madura |
| 3,941,407 A | 3/1976 | Breford |
| 4,017,095 A | 4/1977 | Best |
| 4,029,335 A | 6/1977 | Cady et al. |
| 4,039,087 A | 8/1977 | Sandvick, Sr. |
| 4,134,601 A | 1/1979 | Propst |
| 4,429,892 A | 2/1984 | Frampton et al. |
| 4,477,100 A | 10/1984 | Elyakim |
| 4,505,344 A | 3/1985 | Hobbs et al. |
| 4,531,774 A | 7/1985 | Whatley |
| 4,614,355 A | 9/1986 | Koch |
| 4,721,323 A | 1/1988 | Czuk et al. |
| 4,856,804 A | 8/1989 | Nash |
| 4,892,324 A | 1/1990 | Spencer et al. |
| 4,921,266 A | 5/1990 | Beals |
| 4,928,987 A | 5/1990 | Hunger |
| 4,946,183 A | 8/1990 | Benson et al. |
| 4,960,288 A | 10/1990 | Chambers |
| 4,962,945 A | 10/1990 | Vannoy et al. |
| 5,044,651 A | 9/1991 | Weikel |
| 5,120,080 A | 6/1992 | Ritter |
| 5,141,277 A | 8/1992 | Alexander |
| 5,246,244 A | 9/1993 | Colibert |
| 5,306,037 A | 4/1994 | Robertson |
| D362,224 S | 9/1995 | McCoy et al. |
| 5,449,191 A | 9/1995 | Cattau |
| 5,509,682 A | 4/1996 | Lindenman et al. |
| 5,516,137 A | 5/1996 | Kass et al. |
| 5,529,329 A | 6/1996 | McCoy |
| D376,751 S | 12/1996 | Hanson et al. |
| 5,580,073 A | 12/1996 | Irwin et al. |
| D378,077 S | 2/1997 | Lindenman et al. |
| 5,707,070 A | 1/1998 | Lindenman et al. |
| 5,738,471 A | 4/1998 | Zentner et al. |
| 5,772,229 A | 6/1998 | Cattau |
| 5,839,745 A | 11/1998 | Cattau et al. |
| 5,971,418 A * | 10/1999 | Lindenman et al. ....... 280/491.1 |
| 6,065,766 A | 5/2000 | Pulliam |
| 6,170,850 B1 | 1/2001 | Works |
| 6,179,316 B1 | 1/2001 | Sibley, Jr. |
| 6,199,889 B1 | 3/2001 | Golembiewski et al. |
| 6,467,791 B1 | 10/2002 | Fandrich et al. |
| 6,502,846 B2 | 1/2003 | Fandrich et al. |
| 6,520,528 B2 | 2/2003 | Fandrich et al. |
| 6,523,841 B2 | 2/2003 | Glaser |
| 6,533,308 B1 | 3/2003 | Tambornino |
| 6,758,921 B1 | 7/2004 | Streubel |
| 6,824,157 B1 * | 11/2004 | Putnam ..................... 280/491.1 |
| 6,851,695 B2 | 2/2005 | Lindenman et al. |
| 6,969,090 B1 * | 11/2005 | Works .......................... 280/407 |
| 7,121,573 B2 | 10/2006 | Lindenman et al. |
| 7,264,259 B2 | 9/2007 | Lindenman et al. |
| 7,413,390 B1 | 8/2008 | Allison et al. |
| 7,775,541 B2 | 8/2010 | Linger et al. |
| 7,793,968 B1 | 9/2010 | Withers |
| 7,828,317 B2 | 11/2010 | Withers et al. |
| 8,414,009 B2 | 4/2013 | Stanifer |
| 2003/0015855 A1 | 1/2003 | McCoy et al. |
| 2003/0038452 A1 | 2/2003 | Lindenman et al. |
| 2003/0209878 A1 | 11/2003 | Lindenman et al. |
| 2003/0209879 A1 | 11/2003 | Lindenman et al. |
| 2009/0295122 A1 * | 12/2009 | Withers et al. ............. 280/476.1 |
| 2010/0109285 A1 | 5/2010 | Stanifer et al. |

FOREIGN PATENT DOCUMENTS

| | | |
|---|---|---|
| EP | 1078785 A2 | 2/2001 |
| EP | 1036679 B1 | 8/2004 |
| WO | WO2009030026 A1 | 3/2009 |

OTHER PUBLICATIONS

Cequent Towing Products, Inc., Installation Instructions Mounting Kit Ford F250/F350/F450 LD/HD/SD 6' & 8' Beds, Dec. 13, 2006, pp. 1-11, Litho in USA.
Cequent Performance Products, Installation Instructions Gooseneck Mounting Kit Chevrolet/GMC 2500/3500 Heavy Duty Short & Long Bed, (Part No. 4456), Apr. 11, 2011, pp. 1-8.
Instruction Sheet No. 63102N, Make/Model(s) Hide-A-Goose, Mar. 26, 2007, 4 pages.
Instruction Sheet No. 50117N, Make/Model(s) Dodge Pick-Ups, 2003-UP 2500, 3500 All Models, Mar. 22, 2007, 3 pages.
Cequent Towing Products, Inc., Operating Instructions Signature Series 5th Wheel Slider Hitch, pp. 1-12, Jan. 23, 2004, Litho in USA.
Cequent Towing Products, Inc., Installation Instructions Mounting Kit GM '99-'07 "Classic" 1500 (LD/HD) and 2500 5'8" & 6'6" Beds Only, Aug. 29, 2008, 10 pages, Litho in USA.
Cequent Towing Products, Inc., Installation Instructions Mounting Kit Ford 2004-Current F150 5.5', 6' and 8' Beds, 11 pages, Aug. 21, 2008, Litho in USA.
Cequent Towing Products, Inc., Assembly Instructions Signature Series 24K 5th Wheel Hitch, pp. 1-11, Jan. 28, 2004, Litho in USA.
Draw-Tite Catalog 2004, 7 pages.
Draw-Tite Catalog 2005, 7 pages.
Draw-Tite Catalog 2006, 5 pages.
Draw-Tite Catalog, 2007, 6 pages.
Draw-Tite Catalog, 2008, 3 pages.
Reese Catalog, 2004, 8 pages.
Reese Catalog, 2005, 9 pages.
Reese Catalog, 2006, 6 pages.
Reese Catalog, 2007, 7 pages.
Reese Catalog, 2008, 5 pages.
Cequent Towing Products, Inc., Operating Instructions Signature Series 5th Wheel Slider Hitch, pp. 1-12, Dec. 13, 2004, Litho in USA.
Cequent Towing Products, Inc., Assembly Instructions Signature Series 5th Wheel Slider Hitch, pp. 1-16, Jan. 23, 2004, Litho in USA.

(56) References Cited

OTHER PUBLICATIONS

Cequent Towing Products, Inc., Assembly Instructions Signature Series 5th Wheel Slider Hitch, pp. 1-16, Jan. 5, 2004, Litho in USA.
Cequent Towing Products, Inc., Assembly Instructions Signature Series 16K 5th Wheel Hitch, pp. 1-11, Mar. 15, 2005, Litho in USA.
Cequent Towing Products, Inc., Assembly Instructions Signature Series 24K 5th Wheel Hitch, pp. 1-11, Dec. 13, 2004, Litho in USA.
Cequent Towing Products, Inc., Operating Instructions Signature Series 16K 5th Wheel Hitch, pp. 1-9, Dec. 14, 2004, Litho in USA.
Cequent Towing Products, Inc., Assembly Instructions Signature Series Gooseneck, pp. 1-14, Oct. 13, 2006, Litho in USA.
Cequent Towing Products, Inc., Assembly Instructions Signature Series 24K 5th Wheel Hitch, pp. 1-11, Jun. 15, 2006, Litho in USA.
Cequent Towing Products, Inc., Assembly Instructions Signature Series 24K 5th Wheel Hitch, pp. 1-11, May 21, 2008, Litho in USA.
Cequent Towing Products, Inc., Assembly Instructions Signature Series 5th Wheel Slider Hitch, pp. 1-17, Jun. 2, 2004, Litho in USA.
Cequent Towing Products, Inc., Operating Instructions Signature Series 24K 5th Wheel Hitch, pp. 1-9, Mar. 15, 2005, Litho in USA.
Cequent Towing Products, Inc., Operating Instructions Signature Series 24K 5th Wheel Hitch, pp. 1-9, May 21, 2008, Litho in USA.
Cequent Towing Products, Inc., Operating Instructions Signature Series 24K 5th Wheel Hitch, pp. 1-9, Dec. 14, 2004, Litho in USA.
Cequent Towing Products, Inc., Operating Instructions Signature Series 24K 5th Wheel Hitch, pp. 1-9, Aug. 20, 2007, Litho in USA.
Cequent Towing Products, Inc., Assembly Instructions Signature Series 24K 5th Wheel Hitch, pp. 1-11, Jan. 6, 2006, Litho in USA.
Cequent Towing Products, Inc., Operating Instructions Signature Series 24K 5th Wheel Hitch, pp. 1-9, Jan. 28, 2004, Litho in USA.
Cequent Towing Products, Inc., Assembly Instructions Signature Series 5th Wheel Slider Hitch, pp. 1-17, Jan. 24, 2007, Litho in USA.
Cequent Towing Products, Inc., Operating Instructions Signature Series 5th Wheel Slider Hitch, pp. 1-12, Aug. 20, 2007, Litho in USA.
Cequent Towing Products, Inc., Operating Instructions Signature Series 5th Wheel Slider Hitch, pp. 1-12, Jan. 25, 2007, Litho in USA.

* cited by examiner

UNDERBED HITCH MOUNTING SYSTEM

CROSS-REFERENCE TO RELATED APPLICATION

This application is a continuation of U.S. patent application Ser. No. 12/609,062, entitled "Underbed Hitch Mounting System," filed Oct. 30, 2009, which claims benefit from U.S. Provisional Patent Application No. 61/197,732, entitled "Underbed Hitch Mounting System," filed on Oct. 30, 2008, which are both hereby incorporated in their entirety by reference.

FIELD OF INVENTION

The present invention is generally related to a towing apparatus and, more particularly, to an underbed hitch mounting system.

BACKGROUND

Many vehicles are designed to transport freight, goods, merchandise, personal property, and other such cargo. Often, a hitch assembly is utilized to connect a towed vehicle or trailer to a towing vehicle, such as a truck for example, to increase the capacity to transport goods. Many types of coupling devices have been developed for providing this connection between a towing vehicle and a towed vehicle.

It is well known to utilize a trailer hitch to connect a trailer to a towing vehicle. There are many different types of trailer hitches that may be attached to the towing vehicle in a variety of ways, depending on the type of hitch to be used. Some of the most common types of hitches include gooseneck, fifth wheel, front mount, and the like. Often, the type of hitch used to connect a trailer and a vehicle is determined by the size, shape and other features of the trailer. For example, large trailers such as semi trailers and campers often require a fifth wheel hitch, whereas, small and midsized trailers, such as boat trailers, are better suited for gooseneck trailer hitches. Typically, trailers are connected to a towing vehicle by way of a ball hitch secured to the vehicle and a ball socket coupling mechanism on the trailer that mounts over the ball and thereby allows for the trailer to pivot behind the towing vehicle.

Due to the size and weight of many trailers, towing a trailer may cause unsafe conditions for the towing vehicle, such as fishtailing or other unsafe effects. To avoid these unwanted effects, it is preferable to evenly balance and distribute the weight of the trailer over the wheels of the towing vehicle. This is best accomplished by connecting the hitch to the frame or base of the towing vehicle, near the vehicle's center of gravity. Accordingly, fifth wheel and gooseneck hitches mounted to pickup trucks are often connected to the truck frame underneath the bed of the truck.

Traditional fifth wheel hitches include a head assembly for receiving a king pin on a trailer, a base having a plurality of legs, and one or more mounting rails. The mounting rails may be permanently fixed to the frame of a vehicle, such as a pickup truck. For example, the mounting rails may be connected between two portions of a pickup truck frame underneath the truck bed. The mounting rails may include a plurality of holes for receiving the legs of the fifth wheel hitch.

Corresponding openings may be cut in the truck bed and aligned with the holes in the mounting rails. The legs of the fifth wheel hitch may be connected to holes in the mounting rails through the openings in the truck bed, thereby securing the fifth wheel hitch to the frame of the truck. When the fifth wheel hitch is not in use, the legs may be disconnected from the holes in the rails and the hitch may be removed from the bed of the truck. Caps may be placed over the holes to allow the truck bed to be used for other purposes.

Traditional gooseneck hitches also mount to a pickup truck frame, beneath the bed of a truck. A gooseneck hitch is designed for use in a pickup truck similar to a fifth wheel. The difference is that the gooseneck uses a ball and coupler verses a kingpin and pin receiver. Gooseneck hitches include a mounting plate configured to connect to the frame of a truck, a receptacle in the mounting plate configured to receive a ball hitch, and a hitch ball removably connected to the receptacle and configured to engage a coupling member of the trailer. An opening in the bed of the truck is aligned with the receptacle in the mounting plate, allowing the hitch ball to connect to the receptacle through the opening in the truck bed. The hitch balls themselves are typically removable or retractable so that when the hitch is not in use, the hitch ball may be removed or retracted when not in use, so as not to obstruct the bed of the pick-up truck in any significant manner.

Towing vehicles are generally arranged to accommodate either a fifth wheel hitch or a gooseneck hitch, but not both. To convert a towing vehicle from accommodating a fifth wheel hitch to a gooseneck hitch or vice versa is time and labor intensive and inefficient. Furthermore, both fifth wheel hitches and gooseneck hitches are preferably mounted to the vehicle frame near the vehicle's center of gravity. However, since fifth wheel hitches and gooseneck hitches use different mounting configurations, traditionally only one hitch can occupy this location. Therefore, there is a need in the art for an improved apparatus for towing vehicles that allow for selectively accommodating either a fifth wheel hitch or a gooseneck hitch.

SUMMARY

An underbed hitch mounting system is described. The mounting system may be utilized for towing vehicles wherein the mounting system may selectively accommodate either a fifth wheel hitch or a gooseneck hitch. The mounting system may include at least one rail capable of being connected to a vehicle frame, wherein the rail includes at least one socket. The socket may be engaged with a receiving member, wherein the receiving member may be engaged with a leg of a fifth wheel hitch. A mid rail may be connected to the rails and may include a hitch ball socket that is capable of engagement with a hitch.

DESCRIPTION OF THE DRAWINGS

Objects and advantages together with the operation of the invention may be better understood by reference to the following detailed description taken in connection with the following illustrations, wherein.

DETAILED DESCRIPTION

Figure 1:
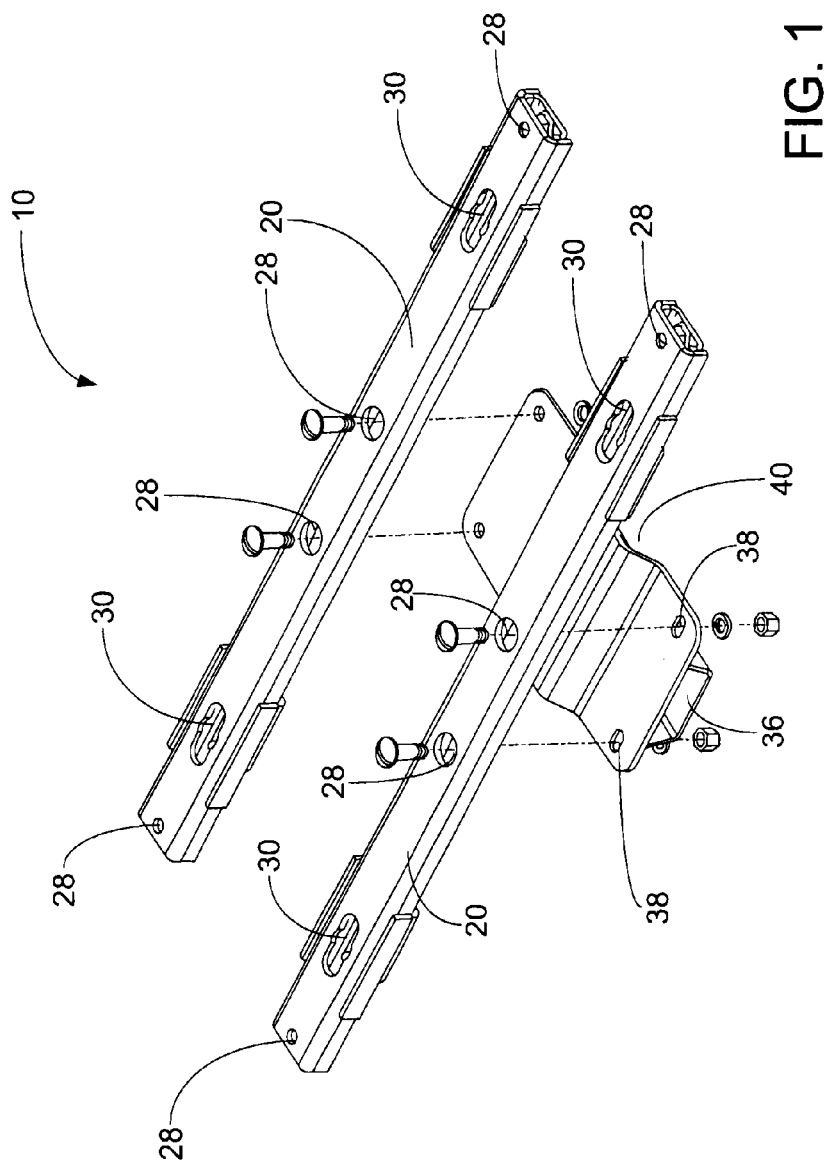
FIG. 1 illustrates a perspective and partially exploded view of an underbed hitch mounting system in an embodiment of the invention.

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

FIGS. 1-7 illustrate an underbed hitch mounting system 10. The underbed hitch mounting system 10 may be used with towing vehicles that allow for selectively accommodating either a fifth wheel hitch 55 or a gooseneck hitch. Trailer hitches, such as a gooseneck or fifth wheel hitch 55 may be mounted to a truck bed. These types of hitches are often mounted beneath the truck bed in conjunction with the truck's own frame rails 52, such as with cross members or rails 20, for example.

The underbed hitch mounting system 10 may include at least one rail mount or cross member 20 and at least one mid rail or adapter plate 40. For example, the mounting system 10 may include two rails 20 and one mid rail or adapter plate 40. The rails 20 may be configured to support a gooseneck hitch (not shown) or a fifth wheel hitch 55. Typical fifth wheel hitches 55 may include a plurality of legs 57 to connect the hitch to a vehicle. While the underbed hitch mounting system 10 may be shown and described as having two rails 20 and one mid rail or adapter plate 40, it is to be understood that there may be any appropriate number of rails or adapter plates and it should not be limited to that shown and described herein.

The rails 20 may be of any appropriate shape or size, such as a generally tubular, square or rectangular shape. Each rail 20 may include one or more sockets 30 (FIGS. 1, 2 and 4-6). The sockets 30 may be of any appropriate shaper or size, such as a generally ovular, circular or rectangular shape. The sockets 30 may be configured to receive and support the legs 57 of a fifth wheel hitch 55. The legs 57 may be secured to the rails 20 through the sockets 30 by any appropriate means, such as by fasteners, being welded, or the like.

The rails 20 may include connecting holes or mounting apertures 28 (FIGS. 1, 2 and 4-6). The mounting apertures 28 may be of any appropriate shape or size, such as a generally circular, ovular or rectangular shape. There may be any number of appropriate mounting apertures 28 and should not be limited to that shown and described herein.

Figure 2:
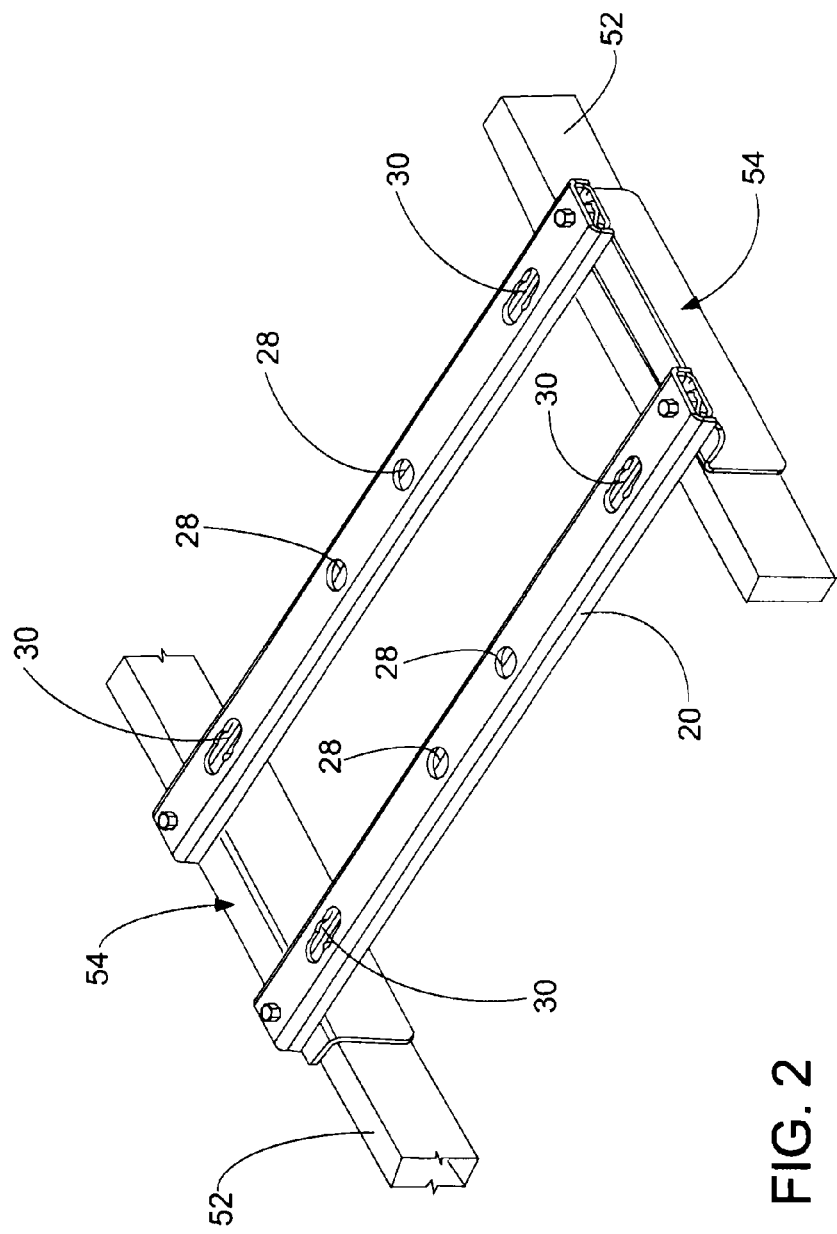
FIG. 2 illustrates a perspective view of a rail assembly.
Figure 4:
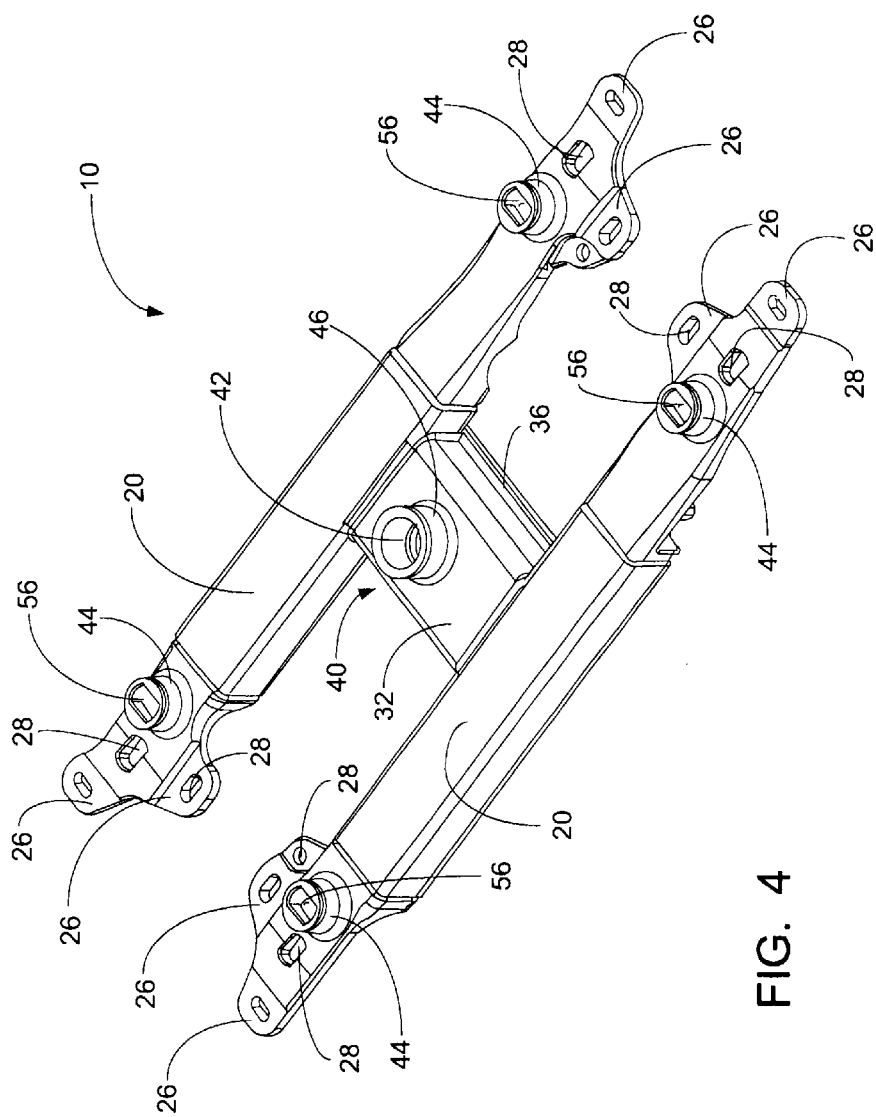
FIG. 4 illustrates a perspective view of an underbed hitch mounting system in an embodiment of the invention.

The mounting apertures 28 may be utilized for connecting another member to the rails 20, such as the adapter plate 40 or attachment brackets 54 (see FIGS. 1, 2 and 4). The mounting apertures 28 may also be used to connect the rails 20 of the hitch mounting system 10 to the underbed of the towing vehicle frame 52. For example, the rails 20 may be connected to the towing vehicle frame 52, such as underneath the truck bed (not shown).

The rails 20 may include one or more attachment brackets 54 (FIG. 2). For example, the mounting system 10 may have two attachment brackets 54. The attachment brackets 54 may be utilized for connecting the rails 20 to the frame 52. The rails 20 may be connected to the attachment brackets 54 by any appropriate means, such as with fasteners, welding or the like. The attachment brackets 54 may be of any appropriate shape or size, such as a general L-shape, rectangular plate or the like. The attachment brackets 54 may be sized and shaped to engage a vehicle frame.

Typical vehicle frames 52 may include two parallel steel members. An end of each rail 20 may connect to a first member of the frame 52 and an opposite end of the rail 20 may connect to a second member of the vehicle frame 52 (FIG. 2). The cross members or rails 20 may extend between the mounting brackets 54. The rails 20 may be of a length sufficient to span the distance between the mounting brackets 54 when those brackets engage the vehicle framework 52. The attachment brackets 54 may form a generally L-shaped bracket to engage the frame 52. The attachment brackets 54 may be attached to the frame 52 by any approaprtie means, such as with fasteners, welding or the like.

The mid rail or adapter plate 40 may be of any appropriate shape or size, such as a generally rectangular or tubular shape that may span the length between the rails 20 (FIGS. 1 and 4). The mid rail or adapter plate 40 may be configured to connect to the rails 20. The mid rail or adapter plate 40 may be attached to the rails by any appropriate means, such as with fasteners, welding or the like.

Figure 3:
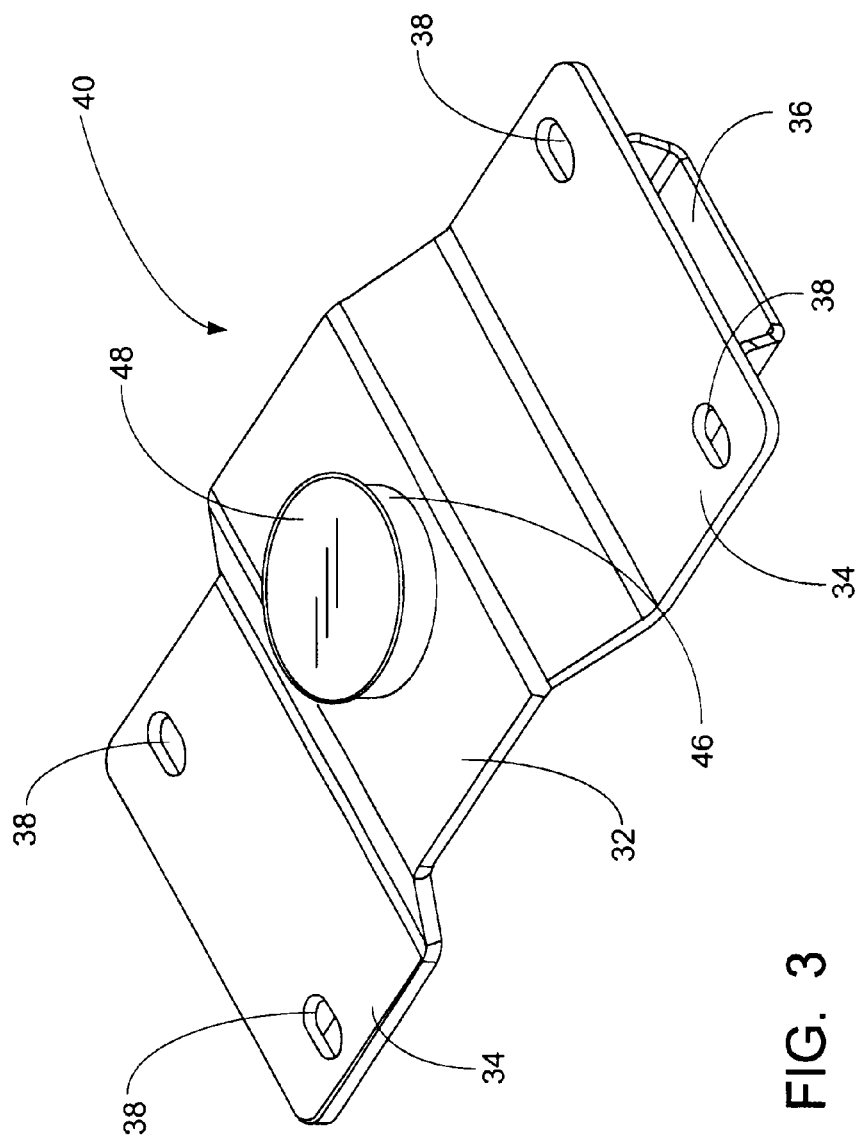
FIG. 3 illustrates a perspective view of an adapter plate.
Figure 5:
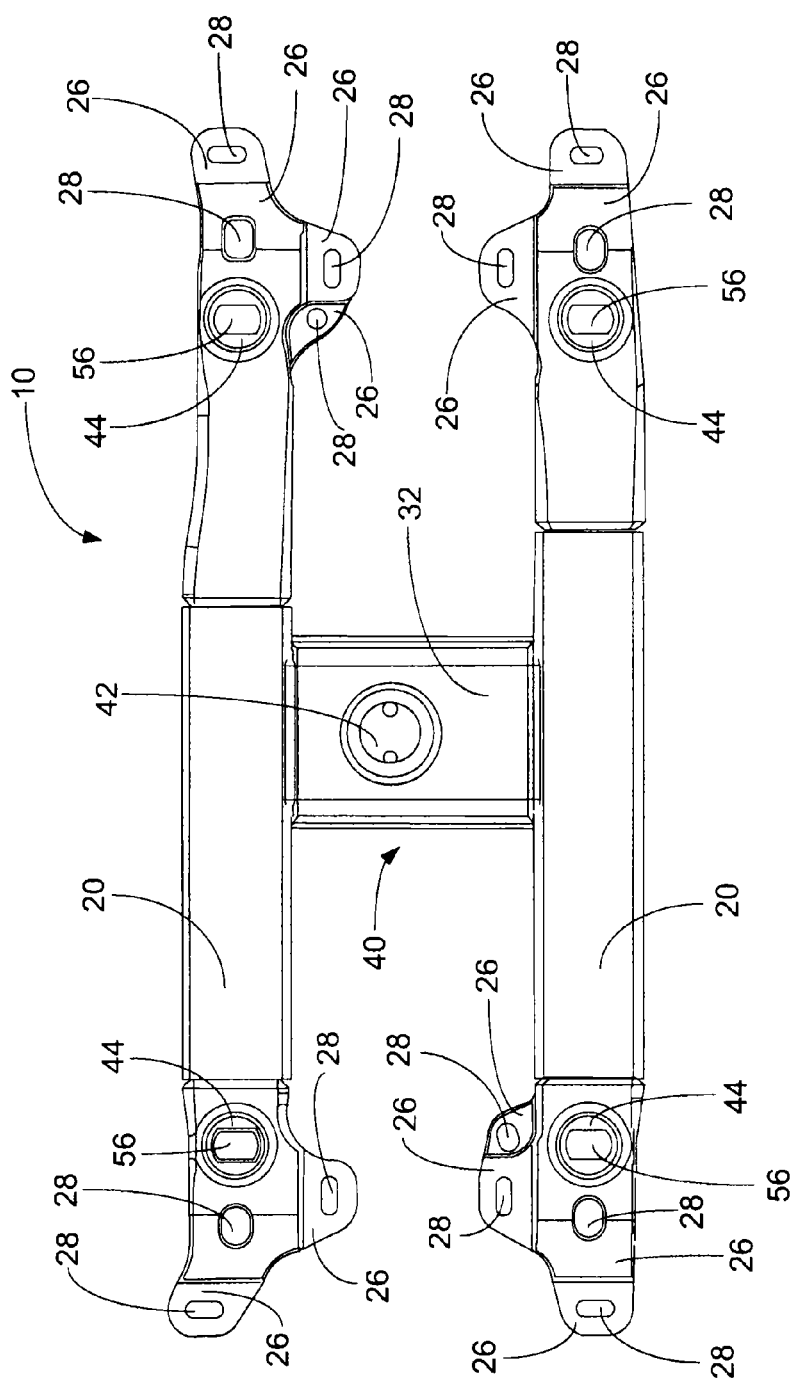
FIG. 5 illustrates a top view of the underbed hitch mounting system of FIG. 4.

The adapter plate 40 may be of a one piece construction or may include several sections that may be secured together. The adapter plate 40 may include a center section 32 and one or more mounting sections 34 extending therefrom. For example, there may be two mounting sections 34 (FIG. 3). As an alternative, there may be no mounting sections 34, such that the center section may be attached directly to the rails 20 (FIGS. 4-6).

The center section 32 may be located between the mounting sections 32. The mounting sections 34 may extend at a downward angle and away from the center section 32, such that the center section 32 may be positioned above the mounting sections 34. The mounting sections 34 may extend in opposite directions away from the center section 32.

The mounting sections 34 may engage the rails 20 at any appropriate location, such as the underside of the rails 20. The mounting sections 34 may be configured to connect to the rails 20 by any appropriate means, such as with fasteners, welding or the like. When the mid rail 40 is connected to the rails 20, the center section 32 may be approximately flush with and parallel to the rails 20 (FIGS. 3 and 4). When the mounting section 34 engages the rails 20, the mounting sections 34 may be approximately parallel to the rails 20. Each mounting section 34 may include one or more openings or rail mounting apertures 38. The mounting apertures 38 may be configured to align with the mounting apertures 28 in the rails 20. The mounting apertures 38 may be of any appropriate shape or size, such as a generally circular, ovular or rectangular shape.

Figure 6:
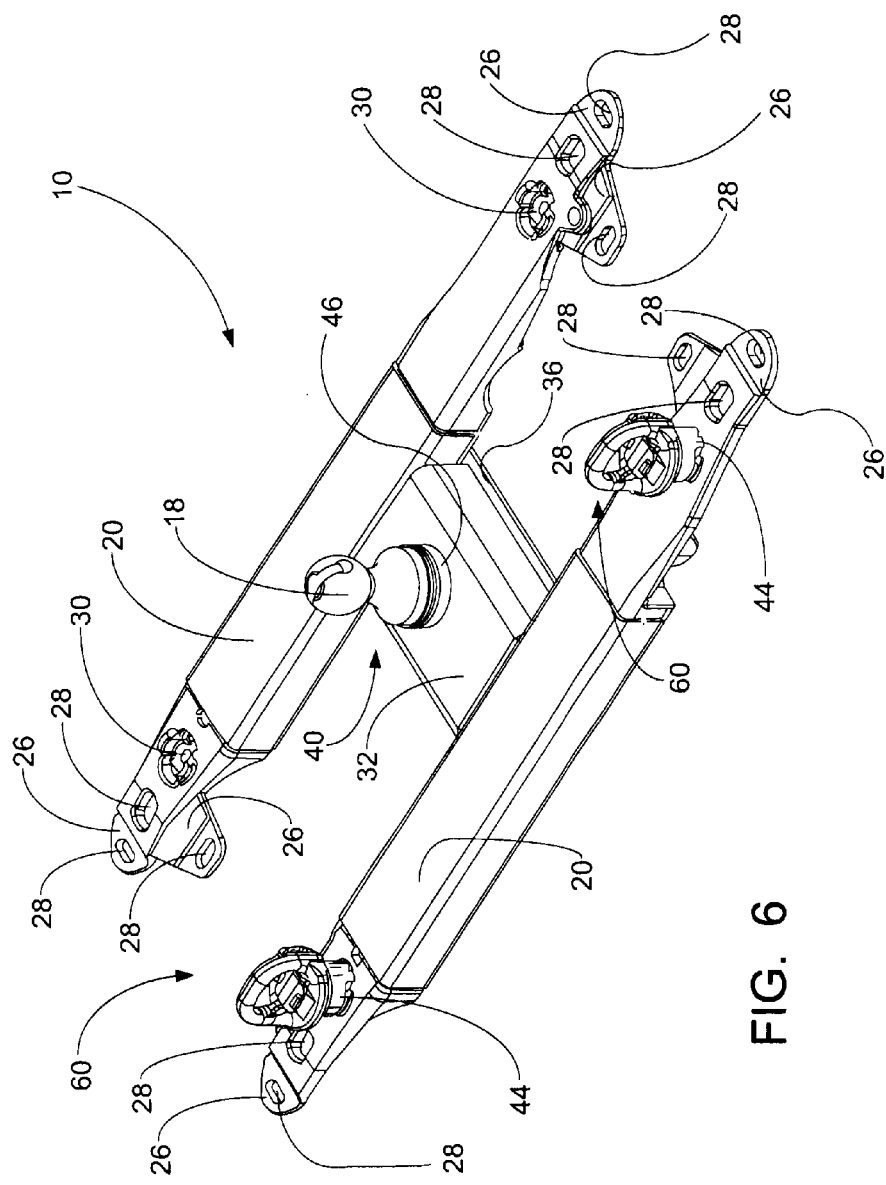
FIG. 6 illustrates a perspective view of an embodiment of the underbed hitch mounting system.
Figure 7:
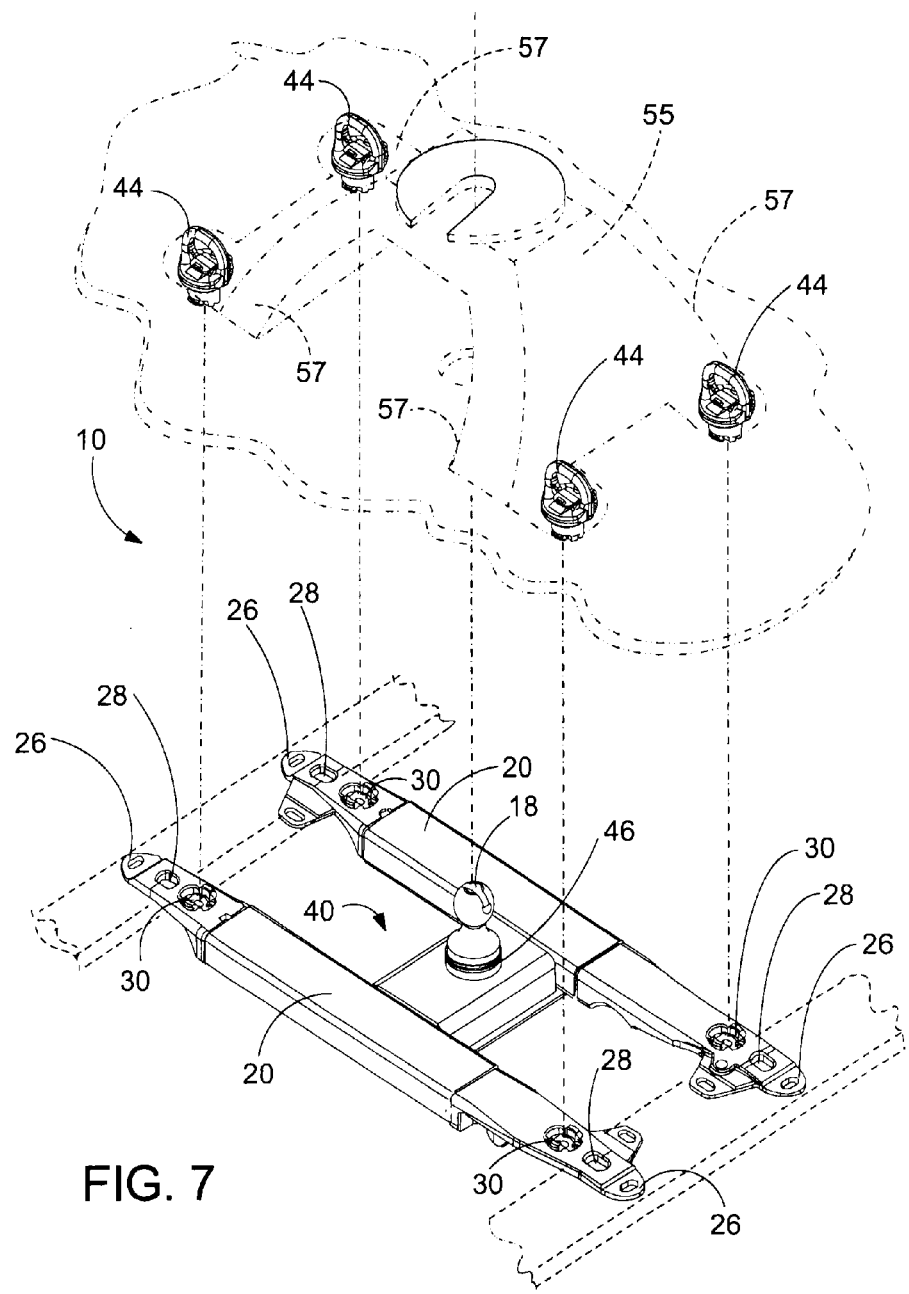
FIG. 7 illustrates a perspective view of embodiments of an underbed hitch mounting system with a fifth wheel hitch in phantom immediately over the underbed hitch mounting system.

The adapter plate or mid rail 40 may also include a base member 36 (FIGS. 3 and 6). The base member 36 may be of any appropriate shape or size, such as a generally square, rectangular or tubular shape. The base member 36 may be attached to the bottom of the adapter plate or mid rail 40. The base member 36 may be attached to the mid rail 40 by any appropriate means, such as by welding, fasteners or the like. The base member 36 may also be secured to the rails 20, such as on the underside of the rails 20 (FIGS. 4 and 6).

The adapter plate or mid rail 40 may be configured to receive a hitch ball 18 (see FIGS. 3 and 4-6). For example, the center section 32 may include a hitch ball socket 42 that may be configured to receive the hitch ball 18. The hitch ball socket 42 may be of any appropriate shape or size, such as a generally cylindrical shape. The hitch ball socket 42 may be located at any appropatie position on the adapter plate 40, such as the approximate center of the adapter plate 40. For example, the hitch ball socket 42 may be configured to receive a removable hitch ball 18 with spring-loaded ball bearings. It should be appreciated, however, that the receptacle may be configured to receive any appropriate type of hitch ball 18 and should not be limited to that shown or described herein.

The hitch ball socket 42 may include a raised collar 46 and a cap 48 (FIG. 3). The raised collar 46 may be of any appropatie shape or size, such as one that may extend above and approximately perpendicularly to the surface of the center section 32. The cap 48 may be of any appropatie shape or size, such as one that may engage the collar 46 and cover the hitch ball socket 42 when a hitch ball 18 is not connected to the hitch ball socket 42.

FIGS. 4-6 illustrate another embodiment of the underbed hitch mounting system 10. The underbed hitch mounting system 10 may utilize a puck mounting system whereby the trailer hitch may be installed in the pickup truck bed with only four small holes (not shown). Utilizing a puck mounting system may provide uninhibited use of the truck bed when the hitch is dismounted. The puck mounting system may also provide for a wider platform and mounting surface, which increases the stability. The puck mounting system may be used with any appropriate trailer hitch mounting kit, such as those that utilize rail mounts or cross members 20 for example, such as with the "Signature Series" produced and sold by Cequent.

The underbed hitch mounting system 10 may include at least two rails or cross members 20. The cross members 20 may include sockets 30 for attachment with a puck or receiving member 44. The cross members 20 may be attached to the vehicle framework 52 by any appropriate means, such as with fasteners, by welding or the like.

Holes may be drilled in the truck bed corresponding to the locations of the sockets 30 in the rails 20 and the hitch ball socket 42. A fifth wheel hitch may be removably connected to the sockets 30 in the rails 20 through the holes located in the truck bed. A hitch ball 18 may be removably connected to the hitch ball socket 42 through the hole in the truck bed, whereby a gooseneck hitch may be utilized.

The cross members 20 may be mounted to the truck bed with the use of the receiving members 44. Each receiving member 44 may be mounted in a socket 30 provided in either of the cross members 20. The receiving member 40 may be secured in the socket 30 by any appropriate means, such as with fasteners, welding or the like. For example, a fastener, such as a bolt, could pass through an aperture in the bottom wall of the cross member 20 and be secured in place by a cooperating nut and lock washer (not shown) if desired.

The puck or receiving member 44 may be of any appropriate shape or size, such as a cylindrical, oval, or a square shape, for example, and should not be limited to that shown and described herein. The receiving member 44 may be a one-piece integrally formed member. Each receiving member 44 may also include an aperture 56 that may receive an accessory member 60. The aperture 56 may also be correspondingly shaped and sized to receive the accessory member 60. Any number or variety of accessories 60 may be utilized with the receiving members 44. The accessory member 60 may be any appropriate or desired type of object, such as a cap or a safety chain tie down member. For example, caps (not shown) may be placed over the receiving members 44 or holes in the truck bed when the hitch is not in use.

FIGS. 4 and 5 illustrate an integrally formed mounting system 10, whereby the receiving members 44 may be formed within the cross members 20. FIG. 6 illustrates a mounting system 10 where the receiving members 44 may be placed and secured into sockets 30 located within the cross members 20. The cross members 20 may be attached to one another by the mid rail 40. The hitch ball socket 42 and corresponding hitch ball 18 may be located on the mid rail 40 (FIGS. 4-6).

The underbed hitch mounting system 10 may include any number or variety of mounting flanges 26 and mounting apertures 28 (FIGS. 4-6). The mounting flanges 26 may be of any appropriate shape or size, such as generally rectangular or circular. The mounting flanges 26 may be located at any appropatie position on the rails 20, such as adjacent or at the ends of the rails 20. The mounting apertures 28 may be located in or around the mounting flanges 26. The mounting apertures 28 and mounting flanges 26 may aid in attached the mounting system 10 to the underbed of the towing vehicle or the vehicle framework 52.

The invention has been described with reference to the embodiments. Obviously, modifications and alternations will occur to others upon a reading and understanding of this specification. The claims as follows are intended to include all modifications and alterations insofar as they come within the scope of the claim or an equivalent thereof.

Having thus described the invention, we claim:

1. An underbed hitch mounting system comprising:
   at least one tubular member having a cross-sectional shape a substantial portion of which is defined by an enclosed peripheral wall with a generally hollow section;
   a central member attached to said tubular member, said central member having a generally tubular body;
   a pair of solid integrally formed members having first and second end portions, wherein said first end portions are fixedly received within said tubular member and said second end portions are configured to attach to a frame of a vehicle; and
   a receiving member integrally formed in each of said pair of solid members, said receiving members configured to engage with a fifth wheel hitch.

2. The underbed hitch mounting system of claim 1, wherein said central member includes a hitch ball sock configured to have selectively secured thereto a hitch ball.

3. The underbed hitch mounting system of claim 1, wherein said pair of solid members include first and second solid members whereby lengths of said first and second solid members are different.

4. The underbed hitch mounting system of claim 1, wherein said pair of solid members include first and second solid members whereby said first and second solid members are asymmetrical.

5. The underbed hitch mounting system of claim 1, wherein said receiving member is formed within each of said pair of solid members.

6. The underbed hitch mounting system of claim 1, wherein said receiving member is attached to each of said pair of solid members.

7. The underbed hitch mounting system of claim 1, wherein said receiving member is attached to each of said solid members with a fastener.

8. A hitch mounting system comprising:
   at least one tubular member having a cross-sectional shape a substantial portion of which is defined by an enclosed peripheral wall with a generally hollow section;
   a central member attached to said at least one tubular member; and
   a pair of solid members fixedly attached to said at least one tubular member, said solid members configured to attach to a frame of a vehicle; and a receiving member integrally formed in each of said pair of solid members, wherein said receiving members are configured to engage a leg of a fifth wheel hitch.

9. The hitch mounting system of claim 8, wherein said central member is permanently attached to said at least one tubular member as a one piece assembly.

10. The hitch mounting system of claim 9, wherein said at least one tubular member includes first and second tubular members wherein said central member is attached between said first and second tubular members.

11. The hitch mounting system of claim 10, wherein said first tubular member has a first transverse length and said second tubular member has a second transverse length, said first transverse length different than said second transverse length.

12. The hitch mounting system of claim 10, further comprising a second pair of solid members wherein said second pair of solid members are fixedly attached to said second tubular member, said second pair of solid members configured to attach to said frame of said vehicle.

13. The hitch mounting system of claim 12, wherein said second pair of solid members are asymmetrical with said pair of solid members.

14. The hitch mounting system of claim 13, wherein said second pair of solid members are of a different configuration than said pair of solid members.

15. The hitch mounting system of claim 13, wherein said pair of solid members include first and second solid members and said second pair of solid members include third and fourth solid members, whereby said first, second, third and fourth solid members are of different lengths.

16. The hitch mounting system of claim 8, wherein said receiving member is formed within each of said pair of solid members.

17. The hitch mounting system of claim 8, wherein said receiving member is attached to each of said pair of solid members.

18. The hitch mounting system of claim 8, wherein said receiving member is attached to each of said solid members with a fastener.

19. A hitch mounting system comprising:
at least one rail configured to attach to a frame of a vehicle, wherein said rail includes a tubular member and first and second solid members fixedly attached to each side of said tubular member whereby said first solid member has a first length in a first direction and said second solid member has a second length in said first direction whereby said first length is greater than said second length;
a mid rail connected to said at least one rail, wherein said mid rail includes a hitch ball socket;
a pair of receiving members integrally formed with said at least one rail, wherein each of said receiving members are configured to engage a respective leg of a fifth wheel hitch; and
a second rail connected with said mid rail, said second rail including a second tubular member having a cross-sectional shape a substantial portion of which is defined by an enclosed peripheral wall with a generally hollow section and third and fourth solid members fixedly attached to each side of said second tubular member.

20. The hitch mounting system of claim 19, wherein said tubular member has a cross-sectional shape a substantial portion of which is defined by an enclosed peripheral wall with a generally hollow section.

21. The hitch mounting system of claim 19, wherein said rail is asymmetrical.

22. The hitch mounting system of claim 21, wherein said tubular member has a first transverse length and said second tubular member has a second transverse length, said first transverse length is different than said second transverse length.

23. The hitch mounting system of claim 21, wherein said first and third solid members are longitudinally spaced from one another and said second and fourth solid members are longitudinally spaced from one another, whereby said fourth solid member has a fourth length, said fourth length different from said second length.

24. The hitch mounting system of claim 21, wherein said second and fourth solid members are transversely asymmetrical.

25. The hitch mounting system of claim 19, wherein said pair of receiving members are formed within said at least one rail.

26. The hitch mounting system of claim 19, wherein said pair of receiving members are attached to said at least one rail.

27. The hitch mounting system of claim 19, wherein each of said pair of receiving members are attached to said at least one rail with a fastener.

28. A hitch mounting system comprising:
first and second rails configured to attach to a frame of a vehicle;
a mid rail connected to said rails, said mid rail having a hitch ball socket;
a base member attached to an underside of at least one said rails and mid rail; and
a pair of receiving members integrally formed with at least one of said rails, wherein each of said receiving members are configured to engage a respective leg of a fifth wheel hitch, wherein said base member is directly attached to said undersides of both said mid rail and said rails.

29. The hitch mounting system of claim 28, wherein said base member is welded to said undersides of both said mid rail and rails.

30. The hitch mounting system of claim 29, wherein said base member provides rigidity to both of said rails and mid rail.

* * * * *